United States Patent [19]

Kawasaki

[11] Patent Number: 4,841,396
[45] Date of Patent: Jun. 20, 1989

[54] DOUBLE GIMBAL MAGNETIC HEAD SUPPORTING MECHANISM FOR A FLOPPY DISK DRIVE

[75] Inventor: Yushi Kawasaki, Higashimurayama, Japan

[73] Assignee: Citizen Watch Co., Ltd., Tokyo, Japan

[21] Appl. No.: 131,554

[22] Filed: Dec. 11, 1987

[30] Foreign Application Priority Data

Dec. 19, 1986 [JP] Japan ................................ 61-303035

[51] Int. Cl.$^4$ ......................... G11B 5/48; G11B 21/16
[52] U.S. Cl. ..................................... 360/104; 360/105
[58] Field of Search ................. 360/104, 105, 103, 102

[56] References Cited

U.S. PATENT DOCUMENTS 4,306,260 12/1981 Maeda et al. ........................ 360/104
4,630,158 12/1986 Spash ................................. 360/103

FOREIGN PATENT DOCUMENTS 0153271 9/1983 Japan ................................. 360/104
0904095 8/1962 United Kingdom .
1234916 6/1971 United Kingdom .
1236765 6/1971 United Kingdom .

Primary Examiner—Stuart N. Hecker
Assistant Examiner—David J. Severin
Attorney, Agent, or Firm—Koda and Androlia

[57] ABSTRACT

A double-sided magnetic head supporting mechanism for reading and writing data on a floppy disk.

One of the magnetic heads is mounted on either a carriage or an arm in a fixed state by a gimbal pair assembly which is movable only vertically and restrained from inclining, and the other magnetic head is mounted on either an arm or a carriage by a biaxial gimbal spring.

The gimbal pair assembly includes a pair of opposing biaxial gimbal springs disposed with a space therebetween and a spacer for fixing the central portions of the gimbal springs. The head is mounted on the central portion of one of the gimbal springs. Since the pair of gimbal springs are integrally fixed at the central portions by a spacer, the gimbal pair assembly can move only vertically, so that parallel vertical movement only is allowed to the head mounted on the gimbal pair assembly with inclination being removed therefrom. Thus, when the double-sided head vertically moves in accordance with the movement of the floppy disk, no offtrack is caused.

4 Claims, 4 Drawing Sheets

DOUBLE GIMBAL MAGNETIC HEAD SUPPORTING MECHANISM FOR A FLOPPY DISK DRIVE

FIELD OF THE INVENTION

The present invention relates to a magnetic head supporting mechanism and, more particularly, to the improvement on a double-sided magnetic head supporting mechanism suitable for a floppy disk drive.

DESCRIPTION OF THE PRIOR ART

Floppy disks consisting of flexible disks with the surfaces thereof subjected to electromagnetic recording coating are known and have recently been widely used as external magnetic recording media for computers.

Such a floppy disk is rotated in the state of being mounted on a floppy disk drive, and the desired reading/writing operation is performed on any given one of a plurality of tracks provided on the surface of the floppy disk. In the reading/writing operation, a read/write head is brought into close contact with the surface of the floppy disk, and data is read from or written on a predetermined track by the electromagnetic transducing operation of the read/write head.

Floppy disk drives have recently been required to be smaller in size and lighter in weight so as to fit a laptop computer and the like, to perform reading/writing operation at a high speed and, in addition, to record with high density so as to increase the memory capacity.

In order to meet these requirements, a read/write head supporting mechanism is also strongly required to be smaller in size and have a higher stability.

A double-sided floppy disk for reading and writing data on both sides of a floppy disk in order to increase the memory capacity of a floppy disk is known. In order to read and write data on such a double-sided floppy disk, a floppy disk drive must have a double-sided magnetic head supporting mechanism.

FIG. 5 shows a double-sided type magnetic head supporting mechanism in the prior art.

In FIG. 5, a carriage 10 is slidably supported by a guide rail fixed on a known floppy disk drive frame (not shown) and moves in the direction indicated by the arrow AB. An upper arm 12 and a lower arm 14 are fixed on the carriage 10, and leaf springs 16 and 18 are supported by the arms 12 and 14, respectively. An upper head 20 and a lower head 22 are fixed to the ends of the leaf springs 16 and 18, respectively, by gimbal springs (details are not shown). The center positions of these gimbal springs are determined by pivots 28 and 29 of pivot arms 24 and 26 provided on the leaf springs 16 and 18, respectively, so that the heads 20 and 22 are freely rotatable in at least two axial directions by the respective gimbal springs.

A floppy disk 100 is rotated by a spindle motor (not shown) mounted on the frame, and both heads 20 and 22 are brought into close contact with both surfaces of the floppy disk 100, so that data is read from or written on a predetermined track with both heads 20 and 22 following the inclination of the floppy disk 100.

FIG. 6 shows the structure of the gimbal spring for supporting each of the heads 20 and 22. A biaxial gimbal spring 30 is made rotatable around the Y-axis by a pair of U-shaped grooves 32a and 32b on the outer periphery, and around the X-axis by a pair of U-shaped grooves 34a and 34b on the inner periphery. Accordingly, both heads 20 and 22 can follow the undulation or inclination of the floppy disk 100 with fidelity. Since the heads 20 and 22 are contacted against the floppy disk 100 by a weak force of the leaf springs 16 and 18, respectively, they can also follow the undulation of the floppy disk 100, in other words, the vertical movement in the direction of the axis of the floppy disk 100, namely, Z-axis shown in FIG. 5.

However, such a conventional device, in which the upper and lower heads 20 and 22 are easily inclined in each axial direction in accordance with the undulation of the floppy disk 100, is apt to cause offtrack. Especially, in double-sided magnetic heads, such offtrack disadvantageously makes reading/writing operation impossible.

An improved double-sided magnetic head supporting mechanism is disclosed in U.S. Pat. No. 4,151,573 (Tandon). FIG. 7 schematically shows this conventional device.

The conventional device shown in FIG. 7 is a lower head fixed type supporting mechanism. The lower head 22 is directly fixed on the carriage 10, and the position of the head 22 does not change. On the other hand, the upper head 20 is mounted on the upper arm 12 through the gimbal spring 30, the upper arm 12 being rockably supported by the carriage 10. The upper head 20 is firmly pressed against the lower head 22 through the floppy disk 100 by a clamp spring 36.

Accordingly, this Tandon type lower head fixed supporting mechanism is advantageous in that the structure is simple and the stability of the heads 20 and 22 are high.

In this conventional device, however, it is necessary to firmly press the floppy disk 100 against the fixed lower head 22 by the upper head 20 irrespective of the undulation of the floppy disk 100. As a result, the heads 20 and 22 and the floppy disk 100 are worn too much to have a long life. In addition, since the heads 20 and 22 cannot move vertically in this conventional device, there is no allowance for an assembly error or the like in the Z-axis direction, so that the read/write track is apt to be displaced in the diametrical direction.

To improve the Tandon type lower head fixed supporting mechanism, what is called a semi-fixed structure is proposed in which the lower head 22 is also supported by the gimbal spring 30 so as to be rotatable in two axial directions, as shown in FIG. 8. According to this conventional device, although the vertical movement of the lower head 22 is regulated by the pivot 29, the pivot 29 makes it rotatable in the two directions of the X- and Y-axes shown in FIG. 6. This device is therefore advantageous in that the durability is higher than that of the Tandon type heads.

Even in the conventional device shown in FIG. 8, however, since the lower head 22 cannot move vertically (in the Z-axis direction) at all, the floppy disk 100 is often forced to deform, and when the floppy disk 100 itself is displaced in the Z-axis direction, the read/write track is disadvantageously displaced in the diametrical direction.

Furthermore, in this conventional device, the lower head 22 is easily inclined with the pivot 29 as its center, and such inclination of the head following the movement of the floppy disk 100 is ready to cause offtrack.

Thus, none of the conventional magnetic head supporting mechanisms can sufficiently meet the recent demand for smaller-sized, higher-speed and higher-density floppy disk drives. In particular, it is impossible to obtain a magnetic head supporting mechanism which can regulate wear and the generation of offtrack so as to fit smaller-sized, higher-speed and higher-density floppy disk drives.

SUMMARY OF THE INVENTION

Accordingly, it is an object of the present invention to eliminate the above-described problems in the prior art and to provide a magnetic head supporting mechanism in which both magnetic heads vertically freely move in accordance with the movement of a floppy disk but scarcely incline so as to be unlikely to cause offtrack, which easily follows the undulation of the floppy disk, and which has a simple structure facilitating machining and assembly.

To achieve this aim, a magnetic head supporting mechanism according to the present invention comprises a lower head and an upper head which are mounted on a carriage and an upper arm, respectively, and are brought into close contact with a floppy disk, the carriage being moved on the diametrical direction of the floppy disk so as to read and write data on a predetermined track, characterized in that either of the heads is supported by a gimbal pair assembly composed of an opposing pair of gimbal springs disposed in the state of being vertically spaced from each other and a spacer for fixing the central portions of the gimbal springs each of which is rotatable separately in two axial directions.

The head is mounted at the central portions of the gimbal spring pair each of which is rotatable separately in two axial directions but which are now fixed with each other by the spacer, as described above. Therefore, the head is made movable only vertically without any inclination by the gimbal spring pair, because the spacer suppresses any inclination of the gimbal springs.

The other head is supported by a gimbal spring so as to oppose the head supported by the gimbal spring pair and be rotatable in two axial directions. Thus, it is possible to bring the read/write surfaces of the heads into correct and close contact with a floppy disk.

In this way, according to the present invention, the double-sided head can easily follow the undulation of a floppy disk vertically, and since the head itself does not incline, no offtrack is caused. Thus, it is possible to obtain a magnetic head which is suitable for high-density recording.

In addition, since the double-sided head of the present invention follows the undulation of a floppy disk while vertically moving, excessive pressure is not applied to the head or the floppy disk, so that it is possible to reduce wear and greatly improve the durability.

As described above, the present invention is characterized in a novel method of utilizing a gimbal pair assembly in which an opposing pair of gimbal springs are disposed with a vertical space therebetween so as to restrain the inclination of the gimbal springs and take advantage of only the vertical movement thereof.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
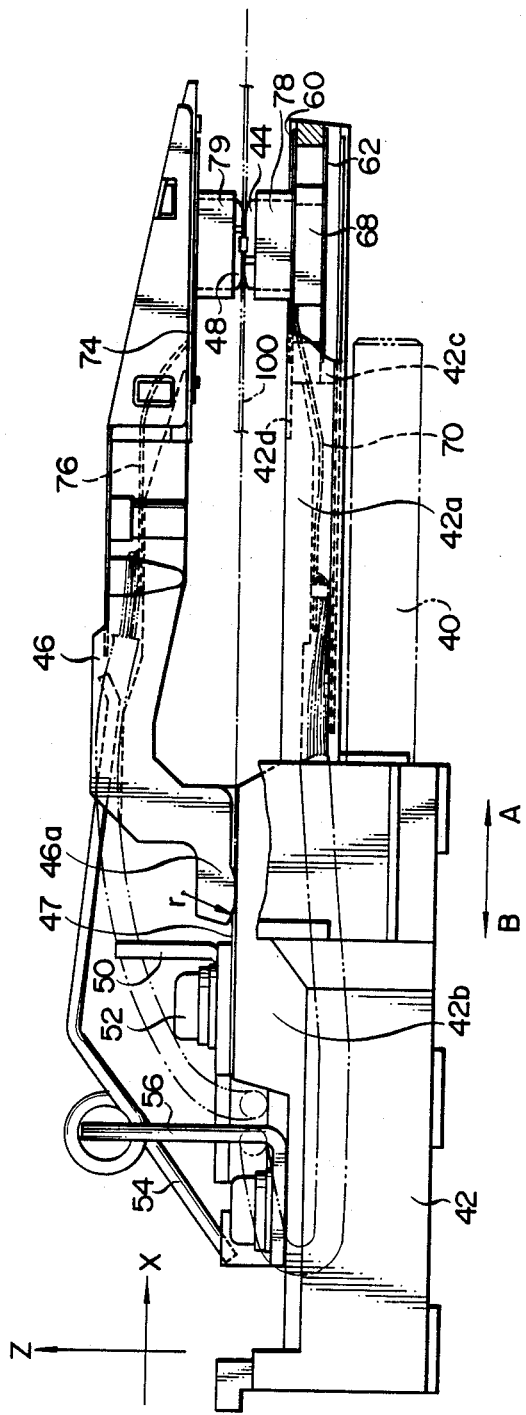
FIG. 1 is a partially cutaway side elevational view of an embodiment of a double-sided magnetic head supporting mechanism according to the present invention in the state in which the mechanism is assembled in a floppy disk drive.

Referring first to FIG. 1 showing a preferred embodiment of the present invention, a lower head is mounted on a gimbal pair assembly in accordance with the present invention.

At least one guide rail 40 is fixed on the frame of a floppy disk drive (not shown) so that a carriage 42 can move along the guide rail 40 in the direction indicated by the arrow AB. The carriage 42, which is a plastic molded monoblock, is carried by the guide rail 40 and holds the lower head 44 through a gimbal pair assembly described hereinafter at the distal end of a lower arm portion 42a which extends along the guide rail 40.

At the proximal end side of the carriage 42, an upper arm support portion 42b is provided so as to rockably support an upper arm 46 through a support spring 47. The upper arm 46 is also a plastic molded monoblock, and an upper head 48 opposing the lower head 44 is mounted on the distal end thereof. At the proximal end thereof, one end of the support spring 47 is integrally molded with the upper arm 46 by insert molding or other method or fixed thereon by screws or the like.

The other end of the support spring 47 is firmly screwed to the support portion 42b of the carriage 42 by a screw 52 through a lead wire guide 50. In this manner, the upper arm 46 is supported by the support spring 47 so as to be rockable relative to the carriage 42. It is possible, as is known, to insert or remove the floppy disk 100 indicated by the dot and dash line between or from between the heads 44 and 48 by rotating the upper arm 46 counterclockwise as viewed in FIG. 1. Reading/writing operation is performed in the state in which the upper head 48 is opposed to the lower head 44 through the floppy disk 100 and the read/write surfaces of both heads 44 and 48 are brought into close contact with the respective surfaces of the floppy disk 100 by rotating the upper arm 46 clockwise as viewed in FIG. 1.

The upper arm 46 rocks with an arcuate support portion provided at one end of the upper arm 46 as the fulcrum of rocking. The curvature of the arcuate support portion 46a is represented by r. When the upper arm 46 rotates relative to the carriage 42, the fulcrum of rotation is constantly positioned at a predetermined position and constantly comes into smooth contact with the upper surface of the support portion 42b of the carriage 42.

In the embodiment, the support portion 42b of the carriage 42 and, hence, the arcuate fulcrum 46a of the upper arm 46 are flush with the center of the thickness of the floppy disk 100, as is clear from FIG. 1.

Consequently, as will be described hereinafter, it will be understood that when the heads 44 and 48 move vertically relative to the floppy disk 100, the central position of the vertical movement is flush with the plane of the floppy disk 100, so that the vertical movement of the heads 44 and 48 scarcely produces a deleterious influence in the form of an offtrack component.

More specifically, if the position of the fulcrum of rocking of the upper arm 46 is greatly different from the plane of the floppy disk 100 in the vertical direction (in the Z-axis direction), when the head 48 moves vertically, the arcuate movement moves the head 48 not only in the Z-axis direction but also in the X-axis direction, thereby causing offtrack and lessening the effect of the present invention. Consequently, even when the upper head 48 moves vertically, the component of displacement of the head 48 along the plane of the floppy disk 100 is very small, so that the movement does not produce deleterious influence in the form of offtrack.

In this embodiment, in order to press the upper arm 46 and, hence, the upper head 48 against the carriage 42 and, hence, the lower head 44 by a predetermined pressure, a clamp spring 54 is urged to the upper arm 46 by a predetermined urging force. The clamp spring 54 is held in a fixed state by a spring holder which is fixed on the carriage 42.

Figure 2:
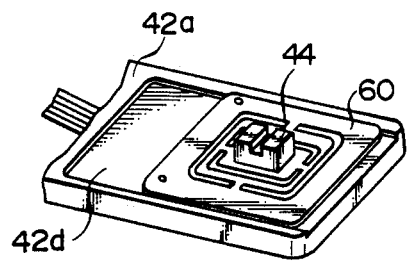
FIG. 2 is a perspective view of the main part of the embodiment shown in FIG. 1 in the state in which the lower head is mounted on the carriage by a gimbal pair assembly of the present invention.
Figure 3:
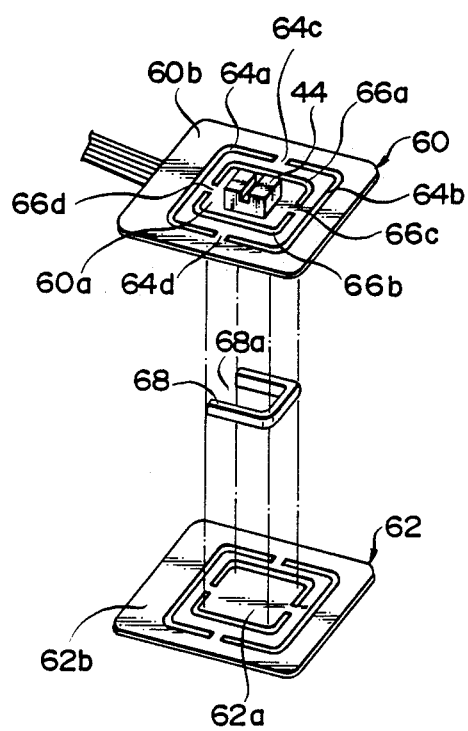
FIG. 3 is an exploded perspective view of the main part shown in FIG. 2.

The characteristic feature of the present invention is that either of the heads is supported by an opposing pair of gimbal springs. In this embodiment, the lower head 44 is mounted on the carriage 42 by the opposing pair of gimbal springs. The details of the supporting structure are shown in FIGS. 2 and 3.

At the distal end of the lower arm portion 42a, an upper recess 42d is provided on the upper surface thereof, while a lower recess 42c is provided on the undersurface thereof. A first gimbal 60 and a second gimbal 62 are fixed on the upper recess 42d and the lower recess 42c, respectively.

Figure 6:
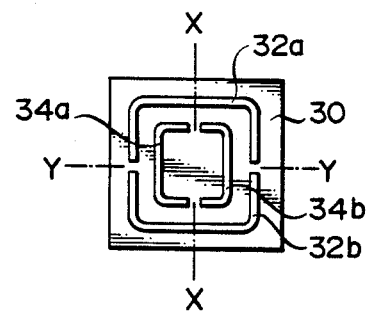
Figure 7:
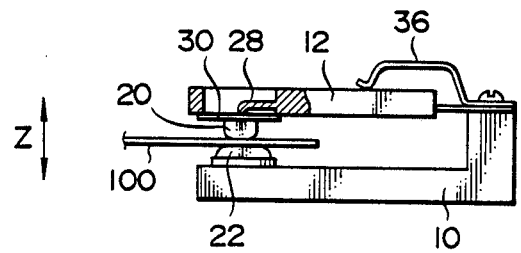
Figure 8:
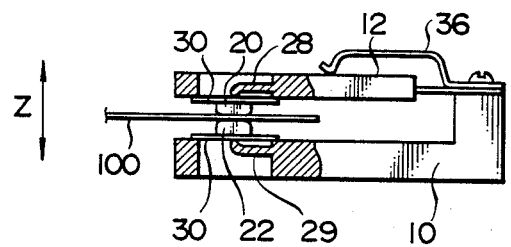

The gimbals 60 and 62 in this embodiment consist of biaxial gimbals of the same configuration. Each of the gimbals 60 and 62 includes a pair of U-shaped grooves 64a, 64b on the outer periphery and a pair of U-shaped grooves 66a and 66b on the inner periphery like the conventional gimbal spring shown in FIG. 6. The central portion 60a of the gimbal can incline in two axial directions and move in the vertical direction. In other words, the central portion 60a of the first gimbal 60 is supported by a pair of outer bridges 64c and 64d formed by the pair of U-shaped grooves 64a and 64b and a pair of inner bridges 66c and 66d formed by the pair of U-shaped grooves 66a and 66b, and is enabled to incline in two axial directions and to move vertically.

Similarly, the central portion 62a of the second gimbal 62 is so designed as to incline in two axial directions and to move vertically.

In this embodiment, the outer peripheral portion 60b of the first gimbal 60 is adhered on the upper recess 42d by adhesion so as to be firmly adhered on the lower arm portion 42a of the carriage 42. At the central portion 60a of the first gimbal 60, the lower head 44 is fixed by adhesion or the like.

On the other hand, the outer peripheral portion 62b of the second gimbal 62 is adhered on the lower recess 42c by adhesion or the like, and a predetermined space is maintained between the first and second gimbals 60 and 62.

The present invention is characterized in that a spacer 68 for fixing the central portions 60a and 62a of the opposing pair of gimbals 60 and 62, respectively, is disposed between the gimbals 60 and 62 in the state of being fixed at the central portions 60a and 62a of the gimbals 60 and 62. As a result, the gimbals 60 and 62, each of which is capable of inclining separately, cannot incline any longer, and are allowed to move only vertically in the form of the assembled gimbal pair.

The spacer 68 in this embodiment has a U-shaped external configuration. The opening 68a thereof opens toward the proximal end of the carriage 42 so that the read/write lead wire connected to the lower head 44 is led to the outside through the opening 68a, thereby facilitating electrical connection of the lower head 44 without interference of the spacer 68.

The spacer 68 may be made of a metal or plastic. In the case of a metal, spot welding at least one end of the spacer 68 with either of the gimbal springs 60 and 62 facilitates assembly. In the case of a plastic spacer 68, the spacer 68 is preferably bonded with both gimbal springs 60 and 62 with an adhesive.

In the above-described way, the two gimbal springs 60 and 62 are integrally fixed on the spacer 68 at the central portions 60a and 62a. The thus-obtained gimbal pair assembly is not allowed to move horizontally in the X-axis or Y-axis direction unlike the conventional one, because the central portions of the gimbal springs 60 and 62 are fixed by the spacer 68 with a vertical space therebetween. Therefore, the inclination relative to either of the axes of rotation X and Y is also stably suppressed, so that the gimbal pair assembly in accordance with the present invention cannot move except in the vertical direction (in the Z-axis direction).

Accordingly, although the head supported by the gimbal pair assembly of the present invention can sufficiently follow the vertical displacement such as undulation of the floppy disk 100, the movement of the head is restricted to parallel vertical movement. As a result, offtrack which is caused by the inclination of a head in the prior art can be safely eliminated. In the embodiment, the lower head 44 is supported by the gimbal pair assembly composed of the opposing pair of gimbals, but the upper head 48 is supported by an upper gimbal spring 74 so as to be able to incline in the same way as in the prior art. In this embodiment, the vertical movement of the central portion of the upper gimbal spring 74 is supported by a pivot similar to a conventional one (details are not shown).

The surface of the upper head 48 is pressed against the lower head 44 through the floppy disk 100 so as to face the position corresponding to the upper surface of the lower head 44 by the urging force of the clamp spring 54.

A lead wire 76 for transmitting a read/write signal to the upper head 48 is led from the inside of the upper arm 46 to the outside through the lead wire guide 50.

In this embodiment, shielding members 78 and 79 are disposed around the heads 44 and 48, respectively, so as to prevent external noise from mixing with the read/write signal.

As described above, according to the present invention, either of the upper and lower heads is mounted on the carriage or the arm by a gimbal pair assembly composed of an opposing pair of gimbals, which is characteristic of the present invention. As a result, when the floppy disk 100 undulates during the rotation or loading, the double-sided heads can follow the undulation of the floppy disk 100 in the vertical direction solely.

Therefore, the double-sided heads of the present invention exhibit stable followability with respect to the error of the floppy disk 100 in the Z-axis direction caused during manufacture or the undulation of the floppy disk 100, and is capable of positioning the read/write track at the correct radial position, thereby enhancing the read/write quality.

Since the double-sided heads move only in the vertical direction and do not incline unlike a conventional one, when they follow the movement of the floppy disk 100, offtrack which is caused by the inclination of the head in the prior art can be safely eliminated.

Furthermore, according to the present invention, the fulcrum of rocking of the upper arm 46 which supports the upper head 48 is substantially flush with the plane of the floppy disk 100. Consequently, even when the upper head 48 moves vertically, the component of displacement of the head 48 along the plane of the floppy disk 100 is very small, so that the movement does not produce deleterious influence in the form of offtrack.

Thus, the present invention provides a magnetic head supporting mechanism which is capable of absorbing the undulation of a floppy disk by slight vertical movement of a double-sided head and which is capable of restricting wear and offtrack to the minimum.

Figure 4:
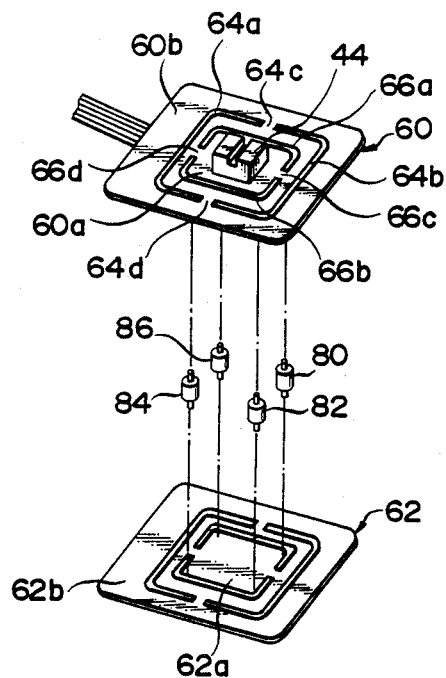
FIG. 4 is a perspective view of the main part of another example of a spacer in accordance with the present invention.
Figure 5:
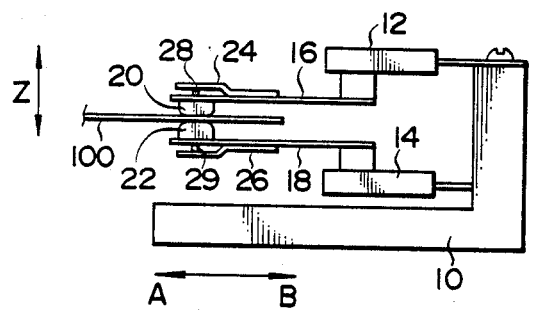
FIGS. 5, 6, 7 and 8 are respectively explanatory views of conventional head supporting mechanisms.

In the above-described embodiment, the spacer 68 is composed of a U-shaped single member, but the spacer 68 for fixing the upper and lower gimbals 60 and 62 at the central portions may have any other configuration. For example, FIG. 4 shows an embodiment which uses a spacer consisting of four columnar pins. These spacer pins 80, 82, 84 and 86 have the same configuration. At both ends of each of the spacer pins, a small-diameter portion having a shoulder portion is formed. These small-diameter portions are fixed within the fixing holes provided at the central portions 60a and 62a of the upper and lower gimbal springs 60 and 62, respectively, by insert molding or adhesion.

In this manner, the gimbal springs 60 and 62 are restrained from inclining by each of the shoulder portions of the spacer pins 80 to 86. Similarly to the gimbal pair assembly of the first embodiment, the gimbal pair assembly including the four spacers shown in FIG. 4 allows the head to move only vertically while suppressing it from inclining, thereby securing good followability of the head free from offtrack.

Although the upper and lower gimbal springs constituting the gimbal pair assembly have the same configuration in the above-described embodiments, they may have different configurations in the present invention.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A magnetic head supporting mechanism having a carriage which is movable in the radial direction of a floppy disk, an arm provided rockably relative to said carriage and magnetic heads which are mounted on said carriage and said arm, respectively, and are brought into close contact with opposite surfaces of said floppy disk for reading/writing operation, said magnetic head supporting mechanism, characterized in that:
    one of said magnetic heads is supported by one of said carriage or arm through a gimbal pair assembly in the state of being movable only vertically and restrained from inclining,
    said gimbal pair assembly including a pair of biaxial gimbal springs with the outer-peripheries thereof fixed on said one of said carriage or said arm, and a spacer for fixing central portions of said pair of gimbal springs with a space therebetween and said one of said magnetic heads being mounted on the central portion of said gimbal pair assembly in a fixed state;
    the other one of said magnetic heads is mounted on the other of said arm or said carriage through a biaxial gimbal spring.

2. A magnetic head supporting mechanism according to claim 1, wherein a lower head comprising one of said magnetic heads is mounted on said carriage by said gimbal pair assembly, while an upper head comprising said other of said magnetic heads is fixed on said arm by said biaxial gimbal spring, and the fulcrum of rocking of said arm is substantially flush with the plane of said floppy disk.

3. A magnetic head supporting mechanism according to either of claims 1 or 2, wherein said spacer is composed of a U-shaped member, and a lead wire is led from the opening of said spacer.

4. A magnetic head supporting mechanism according to either of claims 1 or 2, wherein said spacer is composed of columnar spacer pins having shoulder portions at both ends thereof which are bonded with said gimbal springs.

* * * * *